(12) United States Patent
Natsuyama

(10) Patent No.: US 6,977,694 B2
(45) Date of Patent: Dec. 20, 2005

(54) FRAME AND IMAGE DISPLAY DEVICE

(75) Inventor: Yoshifumi Natsuyama, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 09/907,396

(22) Filed: Jul. 17, 2001

(65) Prior Publication Data

US 2002/0063812 A1    May 30, 2002

(30) Foreign Application Priority Data

Aug. 25, 2000  (JP) .............. 2000-256538

(51) Int. Cl.⁷ .......................... G02F 1/1333
(52) U.S. Cl. ...................... 349/60; 349/58
(58) Field of Search .................. 349/58, 60, 59; 362/26

(56) References Cited

U.S. PATENT DOCUMENTS

| | | | | |
|---|---|---|---|---|
| 3,922,051 A | * | 11/1975 | Reynolds ................. | 439/59 |
| 5,313,318 A | * | 5/1994 | Gruenberg et al. ......... | 349/65 |
| 5,422,751 A | * | 6/1995 | Lewis et al. .............. | 349/59 |
| 5,631,756 A | * | 5/1997 | Itazawa ................... | 349/58 |
| 5,659,376 A | * | 8/1997 | Uehara et al. ............. | 349/58 |
| 5,703,665 A | * | 12/1997 | Muramatsu et al. ......... | 349/60 |
| 5,710,607 A | * | 1/1998 | Iwamoto et al. ........... | 349/60 |
| 6,034,751 A | * | 3/2000 | Kamiya .................... | 349/60 |
| 6,507,377 B1 | * | 1/2003 | Jung ....................... | 349/60 |

FOREIGN PATENT DOCUMENTS

| | | | | |
|---|---|---|---|---|
| JP | 04131890 | | 5/1992 | |
| JP | 07160423 | * | 6/1995 | ........... G06F 3/033 |
| JP | 11030786 | | 2/1999 | |

OTHER PUBLICATIONS

Merriam Webster's Collegiate Dictionary 10TH Ed. (1999) at p. 846.*

* cited by examiner

Primary Examiner—Robert H. Kim
Assistant Examiner—Jeanne Andrea Di Grazio
(74) Attorney, Agent, or Firm—F.Chau & Associates, LLC

(57) ABSTRACT

An upper frame comprises a base part, end parts and side walls. The base part has a picture-frame shape continuous in the circumferential direction. The base part has four inner limbs, and the end parts extend from the inner limbs. In a state in which the end parts do not press a liquid crystal display panel, the end parts are bent relative to the base part in the direction of the liquid crystal display panel which is to be placed, i.e., in the direction in which the liquid crystal display panel is to be pressed. Considering the relation to the side walls, each of the end parts forms an acute angle. The side walls are pendent from outer limbs of the base part at a substantially right angle and are continuous in the circumferential direction.

4 Claims, 7 Drawing Sheets

FRAME AND IMAGE DISPLAY DEVICE

BACKGROUND OF THE INVENTION

1. Technical Field

The present invention relates to a frame for holding a display panel such as a liquid crystal display panel and an image display device using the frame.

2. Discussion of Related Art

A liquid crystal display has become remarkably widespread as an image display device for a personal computer (PC) or other various types of monitors. Generally, this type of liquid crystal display comprises a backlight, which is a planar light source for lighting, placed on the back of a liquid crystal display panel, and thus the liquid crystal display is configured so as to make an image formed on a liquid crystal surface into a visible image by illuminating the overall liquid crystal surface having a predetermined dimension in uniform brightness emitted from the backlight.

In the liquid crystal display, the liquid crystal display panel having a liquid crystal material sealed between a pair of glass substrates is sandwiched and held between a metallic upper frame called a bezel, which is placed on the side of an image display surface, and a lower frame made of resin for containing a backlight unit or the like placed on the back side of the liquid crystal display panel.

A structure for fixing the liquid crystal display panel of the liquid crystal display will be described with reference to FIGS. 7 to 9. FIG. 7 is an exploded perspective view of the liquid crystal display for use in a notebook PC, for example. FIG. 8 is a fragmentary enlarged view of FIG. 7. FIG. 9 is a fragmentary sectional view of FIG. 7.

As shown in FIGS. 7 to 9, a backlight unit 32, a liquid crystal display panel 33, a TAB (Tape Automated Bonding) 34 and so on are contained within a lower frame 31. A rubber cushion 36 made of silicone rubber or the like is stuck to the periphery of the TAB 34 of the liquid crystal display panel 33. The liquid crystal display panel 33 is held and fixed between an upper frame 30 called a bezel and the lower frame 31 with the rubber cushion 36 interposed therebetween.

Various proposals have been heretofore made for a method of holding the liquid crystal display panel. For example, a frame constituted of a plurality of parts is proposed in Japanese Patent Laid-Open No. Hei 4-131890. The frame described in Japanese Patent Laid-Open No. Hei 4-131890 is designed in view of productivity: when a frame is formed of only one part, a type of frame according to a size of the liquid crystal display is required.

Moreover, an integral-type frame provided with engaging parts, each of which has a substantially-inverted-L-shaped cross section, on three sides of a pedestal portion is proposed in Japanese Patent Laid-Open No. Hei 11-30786. An object of the integral-type frame is to reduce the number of parts constituting a frame structure and the number of processes required for assembly.

Furthermore, with respect to a liquid crystal display comprising a touch panel, it is proposed that one end of the touch panel is brought into contact with a flap part standing on a bezel which holds the liquid crystal display panel in Japanese Patent Laid-Open No. Hei 7-160423. An object of Unexamined Japanese Patent Application Publication No. Hei 7-160423 is to improve the accuracy in aligning the liquid crystal display panel with the touch panel by the contact of the touch panel with the flap part.

The above-mentioned frame comprising a plurality of parts described in Japanese Patent Laid-Open No. Hei 4-131890 can, indeed, reduce the number of types of frames, but the frame has a problem of requiring processes for assembling a plurality of parts into a frame.

The above-mentioned integral-type frame described in Japanese Patent Laid-Open No. Hei 11-30786 is adapted to press the liquid crystal display panel with sufficient force to mount the liquid crystal display panel. However, it is not desirable that pressing force is applied to the liquid crystal display panel, since thin films of various electrodes, wiring and so on are formed on the liquid crystal display panel. A thickness of each of the glass substrates constituting the liquid crystal display panel is about 0.7 mm. Therefore, the force capable of pressing the liquid crystal display panel has its limits, and thus the strength of the engaging parts each having the substantially-inverted-L-shaped cross section cannot be increased. This indicates that there is a possibility that sufficient force for holding the liquid crystal display panel cannot be obtained.

Since the prices of PCs are becoming increasingly lower, the cost of the liquid crystal display that is a component of a PC must also be lowered. Although Japanese Patent Laid-Open Nos. Hei 4-131890 and Hei 11-30786 are attractive proposals, the frames described in these gazettes are not yet put into practical use, and the structure using the upper frame 30 and the lower frame 31 shown in FIGS. 7 to 9 is still adopted.

The structure in which the touch panel placed at a predetermined position is held by bending the flap part of the bezel is proposed in Japanese Patent Lain-Open No. Hei 7-160423. It can be said that the holding of the touch panel by bending the bezel is a preferable approach for enabling the reduction of the cost in the case of holding not only the touch panel but also the liquid crystal display panel. However, strong force must be applied at the time of bending the flap part in order to obtain sufficient holding force, and, in some cases, the force may do damage to the liquid crystal display panel. Thus, the object of Japanese Patent Laid-Open No. Hei 7-160423 is only to improve the accuracy in aligning the liquid crystal display panel with the touch panel, and does not give sufficient suggestions about the method of holding the liquid crystal display panel.

SUMMARY OF THE INVENTION

In view of the foregoing background, an object of the present invention is to provide a frame capable of realizing low cost and additionally capable of holding a display panel with safety and reliability. Another object of the present invention is to provide an image display device using the frame.

In order to solve the foregoing problems, the inventor has first studied the elimination of sticking of the rubber cushion 36 in the conventional liquid crystal display described with reference to FIGS. 7 to 9, because a material cost of the rubber cushion 36 itself is required and moreover the process of sticking of the rubber cushion 36 is a big factor that raises the cost.

A simple elimination of the rubber cushion 36 causes the following problem. The conventional liquid crystal display has a structure in which the liquid crystal display panel 33 is pressed and fixed between the frames with the rubber cushion 36 interposed therebetween. When the liquid crystal display is subjected to shock, the rubber cushion 36 serves to absorb the shock and thus prevent the liquid crystal display panel 33 from being shocked. In other words, it is not acceptable that the liquid crystal display panel 33 has only to be firmly fixed. Since the upper frame 30 called the bezel, which has been heretofore used, is obtained by press-molding a metallic material (e.g., stainless steel) and the cross section thereof is L-shaped, the upper frame 30 has high rigidity. The upper frame 30 serves to provide rigidity to the liquid crystal display panel 33. Consequently, when the liquid crystal display panel 33 is pressed by the upper frame 30 having high rigidity, shock applied to the liquid crystal display is insufficiently absorbed.

The inventor has noted that, when corners of the upper frame 30 are notched by a predetermined dimension, rigidity of a portion between notches is reduced, and thereby elasticity can be provided to the portion. Therefore, a frame of the present invention which holds a rectangular display panel having an image display surface comprises: a pressing part having a frame-shaped base part which is continuous in the circumferential direction and has four inner limbs, and an end part extending from at least one of the four inner limbs and having lower rigidity than that of the base part, the pressing part facing the image display surface; and side walls pendent from the base part of the pressing part.

In the frame of the present invention, the end part extending from the base part has lower rigidity than that of the base part. Therefore, the display panel is directly pressed by the end part, whereby the display panel is held, and, in addition, shock absorption can be achieved when the display panel is shocked. Moreover, the base part of the pressing part has high rigidity because the base part is continuos in the circumferential direction, and therefore the base part as well as the side walls also functions to provide rigidity to the display panel.

In the frame of the present invention, it is desirable that the end part is bent in the direction of the display panel which is to be placed. Thus, sufficient pressing force can be applied to the display panel.

In the frame of the present invention, when the end part is bent in the direction of the display panel which is to be placed, it is desirable that a concave portion, which is concave in the direction of the display panel which is to be placed, is formed on a boundary between the base part and the end part. When the display panel is pressed and held by the frame of the present invention, the base part and the end part ideally form a flat surface. However, it has been found that, in the case where the end part is simply bent relative to the base part, the boundary portion between the base part and the end part remains as an upward convex portion when the display panel is pressed. The convex portion does not meet a demand to make an image display device thinner. However, the concave portion, which is concave in the direction of the display panel which is to be placed, is formed on the boundary between the base part and the end part, whereby occurrence of the convex portion can be prevented. The formed concave portion also has an effect of increasing the rigidity of the base part.

The frame of the present invention can be formed of a press-molded part made of a metallic material. That is, the frame of the present invention can be made through the same process as the process for making a conventional frame, and therefore a rise in cost can be prevented.

The frame of the present invention comprises four inner limbs, and the end part can extend from each of the inner limbs. That is, the end parts can extend from all the four inner limbs, or the end parts can also extend from only two inner limbs facing or perpendicular to each other. Furthermore, the end parts can extend from three inner limbs. This can be appropriately determined in accordance with design of the image display device including the strength of pressing force to be applied to the display panel. When the end parts extend from all the four inner limbs, the pressing force to be applied to the display panel is great and also the balance thereof is superior. When the end parts extend from a plurality of inner limbs, it is desirable that the end parts are independent of one another. This independence is considered in contrast with the circumferential continuity of the base part. For example, when two end parts extending from two inner limbs perpendicular to each other are continuous, the rigidity thereof is high and thus the end parts are to be independent of each other.

According to the present invention, there is provided a frame for holding a rectangular display panel having an image display surface, which comprises: a pressing part for pressing the display panel on the side of the image display surface; and side walls pendent from the pressing part, wherein the pressing part has a base part substantially perpendicular to the side walls and a bent part which extends from the base part and is bent in the direction of the display panel which is to be pressed.

The frame comprises the bent part bent in the direction of the display panel which is to be pressed, and the bent part is to have predetermined elastic force. Therefore, when the bent part presses the display panel, the bent part enables to hold the display panel while absorbing shock applied to the display panel.

In the frame, it is desirable as described above that the pressing part is provided corresponding to four sides of the display panel. Desirably, an edge of the bent part is chamfered. The frame of the present invention is intended to directly press and hold the display panel. Desirably, the frame is made of a metallic material as described above. In this case, the display panel may be scratched. Therefore, the edge of the bent part coming into contact with the display panel is chamfered so as to prevent the occurrence of scratch. Herein, chamfering refers to both forming the edge into a curved surface and forming the edge into an inclined surface.

In the above-described frame of the present invention, the bent part forms an acute angle with the side wall. Therefore, the present invention provides a frame for holding a rectangular display panel having an image display surface, which comprises: side walls facing side surfaces of the display panel; and a pressing part which prevents the display panel from moving in the direction perpendicular to the image display surface and having a bent part which forms an acute angle with the side wall. The bent part is sagged by applying a load to the bent part. The sagging allows the display panel to be pressed and held.

In the above-described frame of the present invention, the pressing part comprises the base part and the end parts, or the base part and the bent parts. However, the present invention has some cases in which the base part is not necessarily essential. For example, when the side walls can ensure sufficient rigidity, it is not necessary to provide rigidity to the pressing part, and thus the pressing part suffices without the base part so long as the pressing part has functions of pressing and holding the display panel. In this case, the pressing part comprises only the bent parts, which are continuously formed from the side walls.

The present invention also provides an image display device in which a display panel is held by using the above-described frame. That is, the image display device of the present invention comprises: an image display panel having a rectangular display region and a frame-shaped non-display region surrounding the display region; and a metallic frame for holding the image display panel by pressing the display panel in the non-display region, wherein the frame has a pressing part placed along the non-display region, the pressing part coming into direct contact with the image display panel in the non-display region and pressing the image display panel with elastic force of the pressing part.

In the image display device of the present invention, the frame can comprise a pressing part having a frame-shaped base part, which is continuous in the circumferential direction and has four inner limbs, and an end part extending from at least one of the four inner limbs and having lower rigidity than that of the base part, the pressing part facing the image display panel; and side walls pendent from the base part of the pressing part. In the case of the frame, the end part can have a length substantially equal to a length of a corresponding side of the image display panel. Moreover, the end parts can be intermittently formed on the corresponding sides of the image display panel.

Furthermore, in the image display device of the present invention, in a state in which the frame does not press the image display panel, the pressing part can comprise a base part substantially perpendicular to the side walls, and a bent part which connects to the base part and forms an acute angle with the side wall.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

The present invention will be described in detail below with reference to embodiments.

First Embodiment

Figure 1:
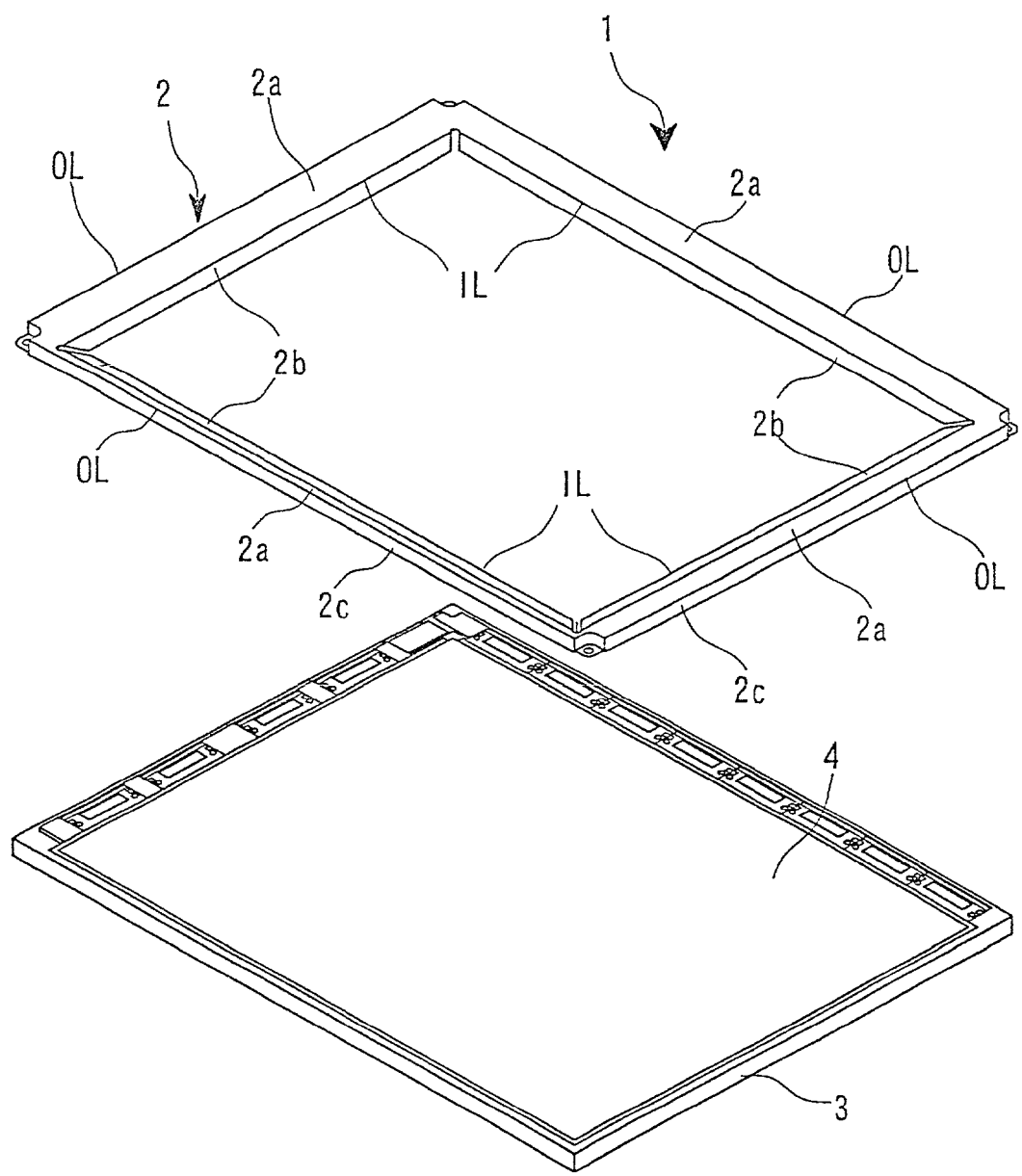
FIG. 1 is an exploded perspective view of a liquid crystal display 1 of a first embodiment.
Figure 2:
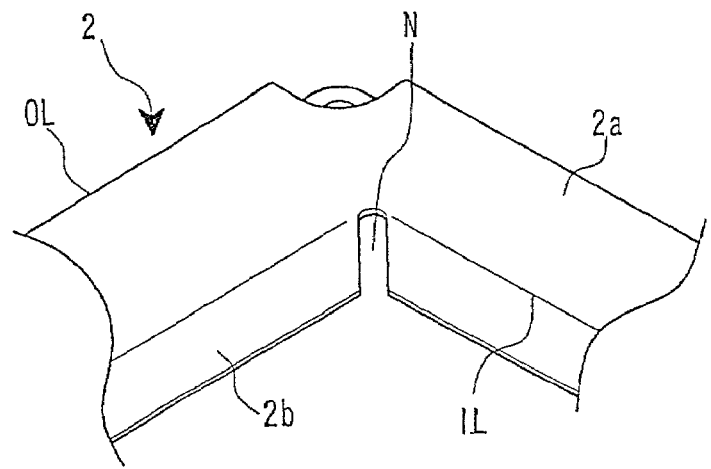
FIG. 2 is a fragmentary enlarged view of the liquid crystal display 1.
Figure 3:
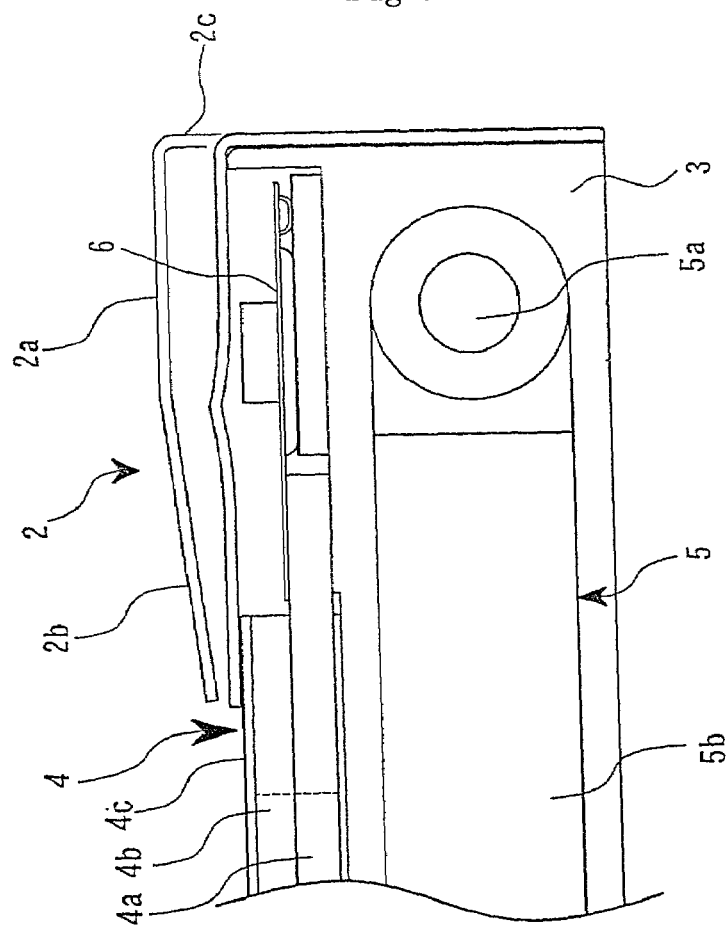
FIG. 3 is a fragmentary sectional view of the liquid crystal display 1.

FIGS. 1 to 3 show a liquid crystal display 1 of a first embodiment. FIG. 1 is an exploded perspective view of the liquid crystal display 1. FIG. 2 is a partly enlarged view of FIG. 1. FIG. 3 is a fragmentary sectional view of FIG. 1.

As shown in FIGS. 1 to 3, the liquid crystal display 1 comprises an upper frame 2 and a lower frame 3. A liquid crystal display panel 4, a backlight unit 5 and a TAB (Tape Automated Bonding) 6 are contained within the lower frame 3 made of resin.

The upper frame 2 is constituted of a press-molded part made of stainless steel and forms a display window delimiting an image display region of the liquid crystal display panel 4. It is a current mainstream that a thickness of the stainless steel to be used is about 0.3 mm. Aluminum alloy is sometimes used as a material of the upper frame 2. The aluminum alloy having a lower specific gravity than that of the stainless steel is particularly suitable for weight saving.

The liquid crystal display panel 4 comprises a TFT array substrate 4a placed at the bottom, a color filter substrate 4b placed at a position with a predetermined distance from the TFT array substrate 4a, and a polarizer 4c laminated on the color filter substrate 4b. Both the TFT array substrate 4a and the color filter substrate 4b are made of rectangular sheet glass having a thickness of about 0.7 mm. The TFT array substrate 4a has a constitution that a display electrode made of a transparent conductive thin film (ITO: Indium Tin Oxide) for display that serves as a pixel, a TFT for functioning as a switching element for driving a liquid crystal, and a storage capacity functioning a signal holding capacity for an active matrix operation, all of them being formed on a glass substrate. On the other hand, the color filter substrate 4b has a constitution that a color filter made of a resin film containing dyes and pigments having three primary colors, red (R), green (G) and blue (B); a black matrix functioning as a light shielding-film placed between pixels of the color filter; a protection film made of a resin film for protecting the color filter and the black matrix; a common electrode made of a transparent conductive thin film (ITO: Indium Tin Oxide); and an orientation film made of a polyimide thin film for orienting the liquid crystal, are laminated in sequence on a glass substrate. The TFT array substrate 4a and the color filter substrate 4b are integrated with each other on the periphery thereof by the use of a sealing compound functioning as an adhesive.

The backlight unit 5 comprises a fluorescent lamp 5a which is a light source, and a light guide plate 5b illuminating the liquid crystal display panel 4 with light emitted from the fluorescent lamp 5a in the form of planar light.

The upper frame 2, which may be called a bezel, is a characteristic constitution of the first embodiment. That is, the upper frame 2 comprises a base part 2a, end parts (bent parts) 2b and side walls 2c.

The base part 2a has a shape of a picture-frame continuous in the circumferential direction. The base part 2a has four inner limbs IL, and the end parts 2b extend from the inner limbs IL.

Since a notch N is provided between the adjacent end parts 2b, each of the end parts 2b is independent of one another in the circumferential direction. In a state in which the end parts 2b do not press the liquid crystal display panel 4, the end parts 2b are bent relative to the base part 2a in the direction of the liquid crystal display panel 4 which is to be placed, in other words, in the direction of the liquid crystal display panel 4 which is to be pressed. Considering the relation to the side walls 2c, each of the end parts 2b forms an acute angle.

The side walls 2c are pendent from outer limbs OL of the base part 2a at a substantially right angle and are continuous in the circumferential direction.

Since the upper frame 2 has the above-described constitution, the base part 2a and the side walls 2c have high rigidity and serve to provide rigidity to the liquid crystal display panel 4. The end parts 2b have lower rigidity than that of the base part 2a and the side walls 2c and have elasticity. That is, the end parts 2b can be sagged relative to the base part 2a. In the first embodiment, the liquid crystal display panel 4 is pressed and held by utilizing this bending.

FIG. 3 shows a state of pressing. The upper frame 2, which has the end parts 2b bent in the direction of the liquid crystal display panel 4 which is to be placed, is mounted to the lower frame 3 containing the liquid crystal display panel 4 and so on. Edges of the end parts 2b come into contact with the polarizer 4c of the liquid crystal display panel 4, and the amount of sagging increases gradually. The end parts 2b are in contact with the liquid crystal display panel 4 at a region in which an image is not displayed (non-display regions). The upper frame 2 is lowered until lower edges of the side walls 2c of the upper frame 2 contact the bottom of the lower frame 3, then the upper frame 2 is fixed by fixing means such as a screw, and thus the mounting of the upper frame 2 finishes.

In the liquid crystal display 1 constituted as described above, the rigidity of the whole liquid crystal display 1 is ensured because the base part 2a and the side walls 2c of the upper frame 2 have high rigidity. Moreover, the liquid crystal display panel 4 is pressed by the elastic force of the end parts 2b of the upper frame 2, and thus the liquid crystal display panel 4 is held between the upper frame 2 and the lower frame 3. Since the liquid crystal display panel 4 is in direct contact with the end parts 2b of the upper frame 2 having elasticity and low rigidity, shock can be absorbed by the end parts 2b even if the liquid crystal display 1 is shocked. Thus, the risk of damaging the liquid crystal display panel 4 is reduced. That is, the upper frame 2 of the first embodiment functions as a rubber cushion 36 of a conventional liquid crystal display.

The upper frame 2 of the first embodiment is manufactured by press molding, similarly to an upper frame 30 of the conventional liquid crystal display. Therefore, the cost can be reduced by the cost of sticking because the sticking of the rubber cushion 36 is not performed.

In the conventional liquid crystal display, the rubber cushions 36 are stuck to only two sides perpendicular to each other of a liquid crystal display panel 33. On the other hand, the upper frame 2 according to the first embodiment has the end parts 2b corresponding to four sides of the liquid crystal display panel 4. Therefore, in the first embodiment, since the liquid crystal panel 4 is pressed on four sides thereof, the liquid crystal display panel 4 can be uniformly held with compared to the conventional liquid crystal display which is pressed only on the two sides thereof.

Second Embodiment

Figure 4:
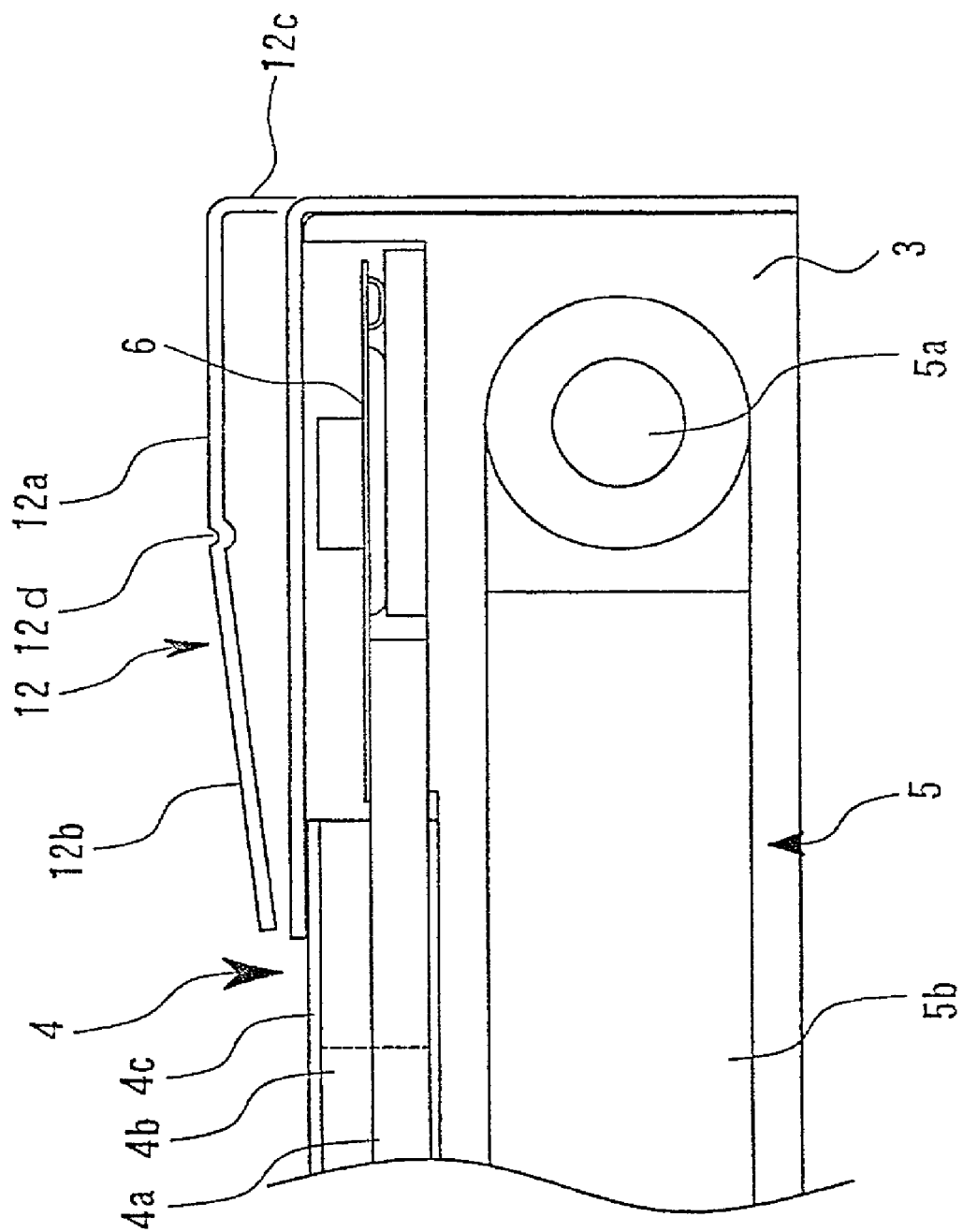
FIG. 4 is a fragmentary sectional view of a liquid crystal display of a second embodiment.

A second embodiment of the present invention will be described below with reference to FIG. 4. FIG. 4 is a fragmentary sectional view of a liquid crystal display of the second embodiment. Note that, the same components as those of the first embodiment will be indicated by the same reference numerals, and the description thereof will be omitted.

As shown in FIG. 4, a basic constitution of the second embodiment is the same as that of the first embodiment, and a difference lies in a detailed structure of an upper frame 12.

Referring to FIG. 3 showing the first embodiment, a boundary portion between the base part 2a and the end part 2b of the upper frame 2 mounted to the liquid crystal display 1 has an upward convex protrusion, because the end part 2b is bent relative to the base part 2a in a state in which the upper frame 2 does not press the liquid crystal display panel 4. The portion of protrusion does no harm to the pressing and holding of the liquid crystal display panel 4. In the case of making the liquid crystal display 1 thinner, however it is necessary to prevent the above-mentioned boundary portion from being the protrusion. The upper frame 12 of the second embodiment has the proposed structure for avoiding protrusion of the boundary portion.

The upper frame 12 comprises a base part 12a, end parts (bent parts) 12b and side walls 12c. The inventor has made a study to avoid the protrusion of the boundary portion between the base part 12a and the end part (bent part) 12b of the upper frame 12. As a result, it is found that the protrusion of the boundary portion can be reduced or avoided by providing in the boundary portion a concave portion 12d which is concave in the direction of the liquid crystal display panel 4 which is to be placed, as shown in FIG. 4. When upward force acts on the end part 12b, the end part 12b rotates relative to the base part 12a using the concave portion 12d as a fulcrum, and thus occurrence of the protrusion can be reduced or avoided. The concave portion 12d has a curved sectional structure in the second embodiment, but the sectional structure thereof is not limited to this embodiment, and the concave portion 12d may have a triangular cross section. It is needless to say that the concave portion 12d can be formed by press molding. The base part 12a has higher rigidity because of the presence of the concave portion 12d formed by press molding.

Third Embodiment

Figure 5:
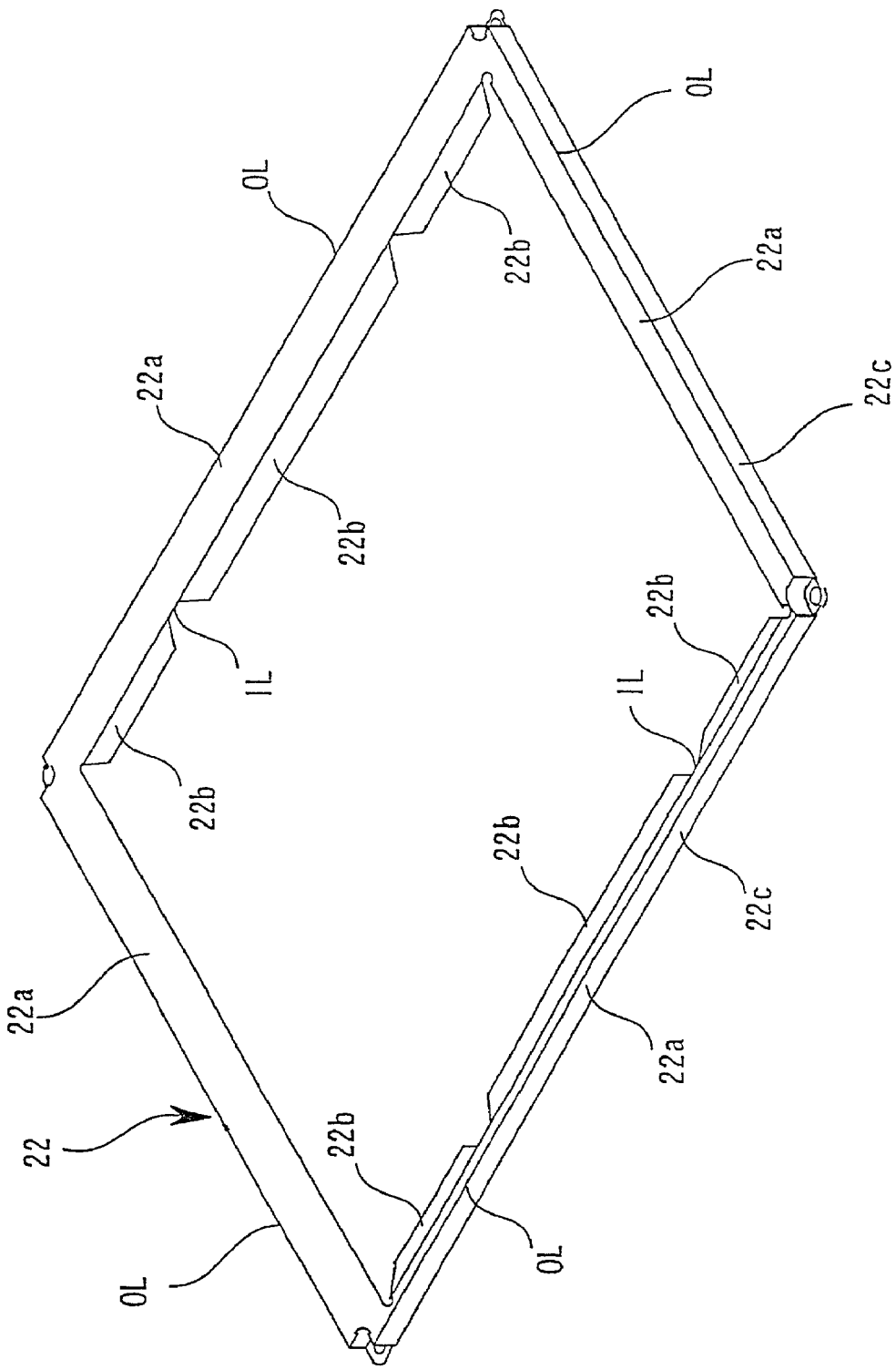
FIG. 5 is a plan view of an upper frame 22 of a third embodiment.

A third embodiment of the present invention will be described below with reference to FIG. 5. FIG. 5 is a perspective view of an upper frame 22 of the third embodiment.

A basic constitution of the upper frame 22 of the third embodiment is the same as that of the upper frame 2 of the first embodiment. That is, the upper frame 22 comprises a base part 22a, end parts (bent parts) 22b and side walls 22c. The base part 22a has a shape of a picture-frame continuous in the circumferential direction and has four inner limbs IL. However, the end parts 22b extend from only the inner limbs IL corresponding to longer sides of the upper frame 22, and the end parts 22b are not provided on the inner limbs IL corresponding to shorter sides of the upper frame 22. Moreover, the upper frame 22 of the third embodiment is different from the upper frame 2 (12) of the first (second) embodiment in that, although the end parts 2b(12b) of the upper frame 2 (12) each have a length substantially equal to a length of each of the corresponding sides of the liquid crystal display panel 4, the end parts 22b of the upper frame 22 are intermittently provided on the corresponding sides of the liquid crystal display panel 4. It is therefore possible to meet a demand to prevent force for pressing the liquid crystal display panel 4 from being excessive or a demand to reduce the weight of the upper frame 22.

Figure 6:
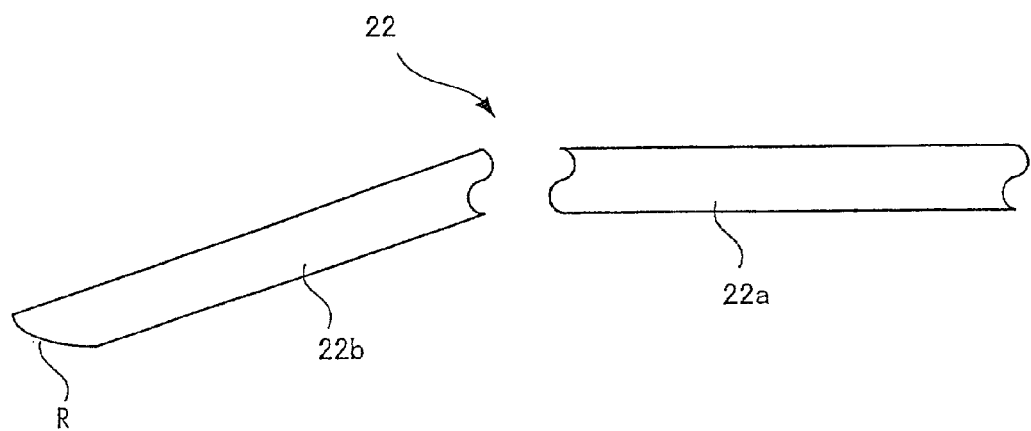
FIG. 6 is a fragmentary sectional view of the upper frame 22 of the third embodiment.
Figure 7:
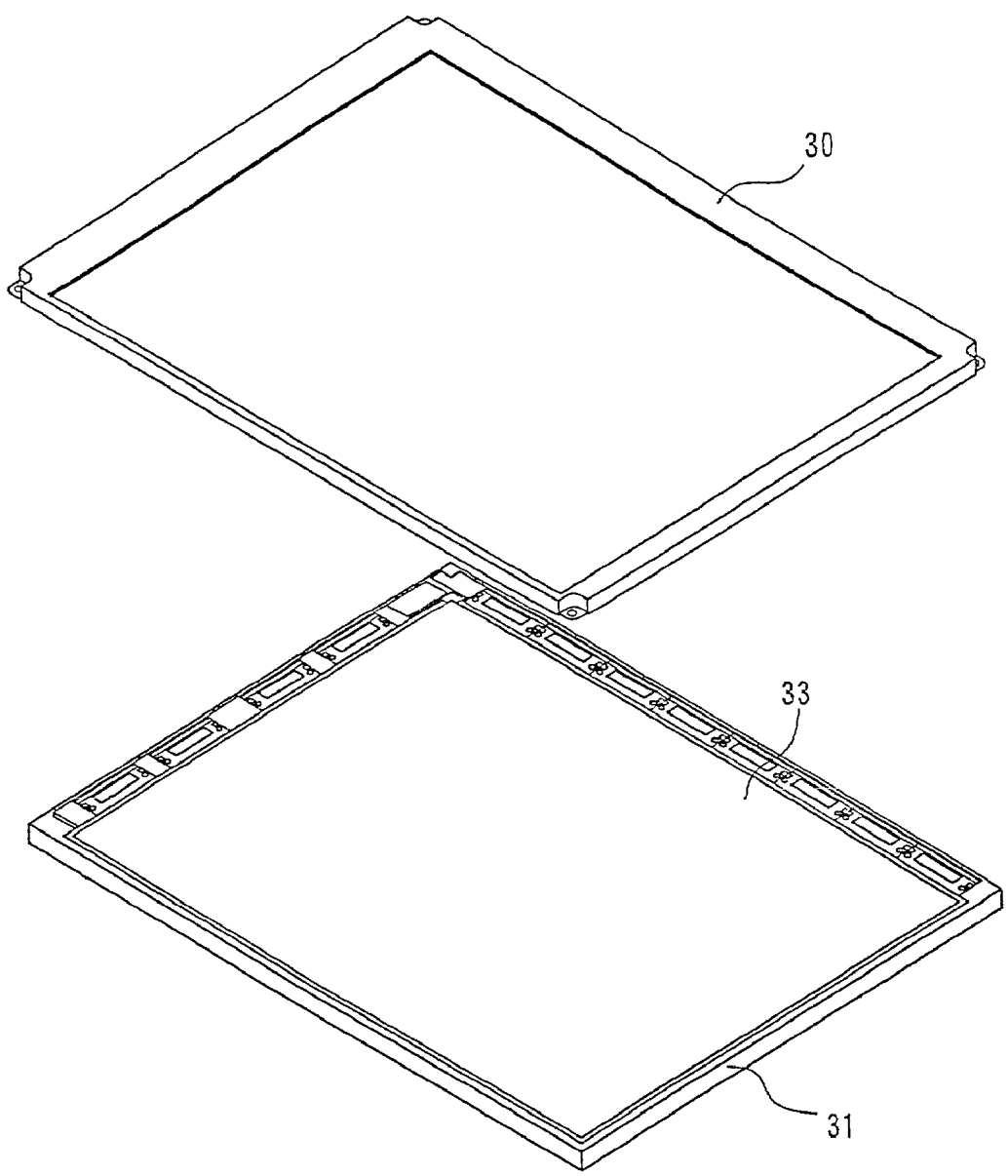
FIG. 7 is an exploded perspective view of a conventional liquid crystal display.
Figure 8:
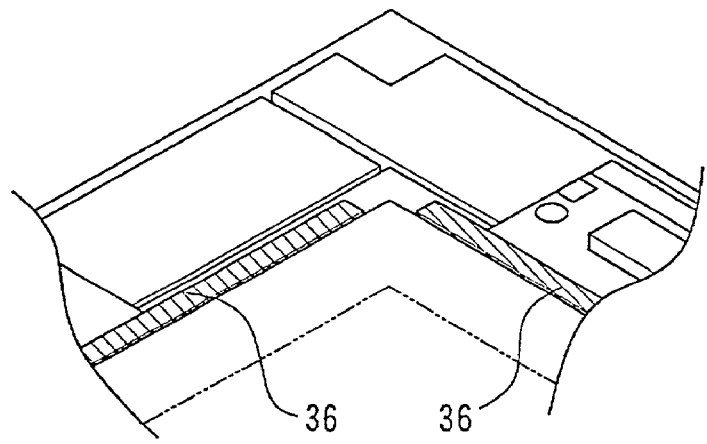
FIG. 8 is a fragmentary enlarged view of the conventional liquid crystal display.
Figure 9:
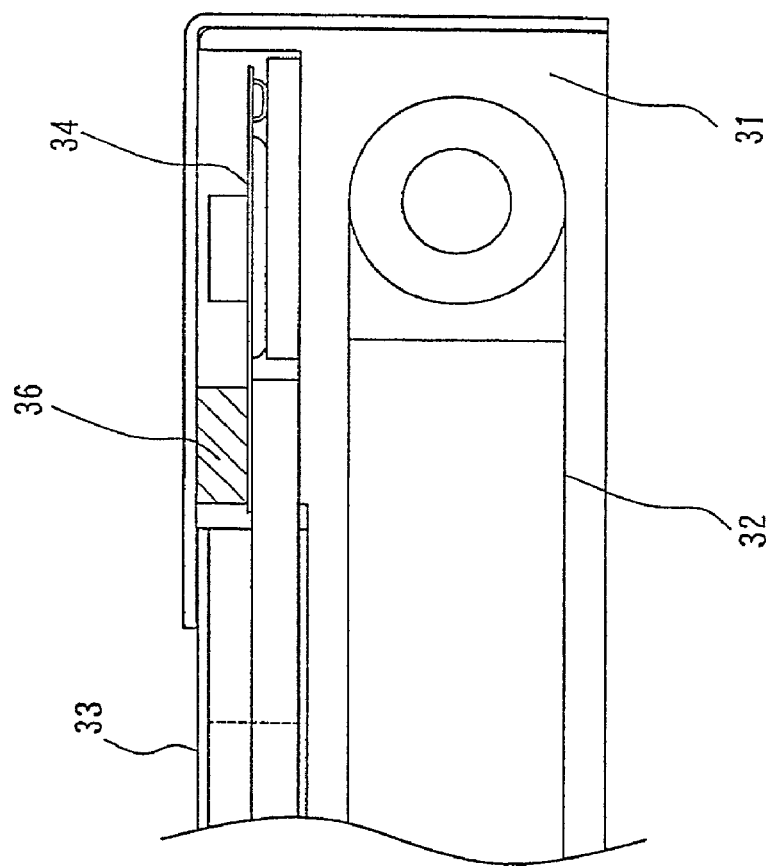
FIG. 9 is a fragmentary sectional view of the conventional liquid crystal display.

Moreover, edges of the end parts 22b are chamfered into curved surfaces R as shown in FIG. 6. Therefore, it can be reduced that the liquid crystal display panel 4 may be damaged when the end parts 22b of the upper frame 22 come into direct contact with the liquid crystal display panel 4.

In the third embodiment shown in FIG. 5, three end parts 22b are formed on one side, but the both-side end parts 22b of the three end parts 22b may be eliminated. It goes without saying that the end parts 22b may be intermittently provided on the inner limbs IL corresponding to the shorter sides.

As described above, the present invention can provide a frame capable of holding a liquid crystal display panel with safety and reliability at low cost.

Although the preferred embodiments of the present invention have been described in detail, it should be understood that various changes, substitutions and alternations can be made therein without departing from spirit and scope of the inventions as defined by the appended claims.

What is claimed is:

1. A pre-formed frame for holding a display panel having an image display surface, the frame comprising:
   an elongated pressing bezel, including a frame-shaped base portion that is continuous in the circumferential direction and has at least one inner limb, and at least one end portion extending from the at least one inner limb and having a lower rigidity than said base portion, said at least one end portion of said elongated pressing bezel for contacting said image display surface of said display panel,
   wherein said frame including said base portion and said at least one end portion is formed of a press-molded part made of a metallic material.

2. The frame according to claim 1, wherein said at least one end portion is bent in the direction of said display panel which is to be placed.

3. The frame according to claim 2, wherein a concave portion, which is concave in the direction of said display panel which is to be placed, is formed in a boundary between said base portion and said at least one end portion.

4. The frame according to claim 1, wherein an end portion extending from a predetermined inner limb of said inner limbs is independent of other end portions extending from the other inner limbs.

* * * * *